United States Patent [19]

Takeda et al.

[11] Patent Number: 4,508,264
[45] Date of Patent: Apr. 2, 1985

[54] HEATER COOLANT CIRCULATION SYSTEM FOR VEHICLE PROVIDING MATCHED HEATING FOR INTAKE SYSTEM AND PASSENGER COMPARTMENT

[75] Inventors: Keisou Takeda; Toshiyuki Hirata, both of Toyota, Japan

[73] Assignee: Toyota Jidosha Kabushiki Kaisha, Toyota, Japan

[21] Appl. No.: 516,333

[22] Filed: Jul. 22, 1983

[30] Foreign Application Priority Data

Aug. 20, 1982 [JP] Japan .................................. 57-145075

[51] Int. Cl.³ ................................................ B60H 1/02
[52] U.S. Cl. ................................ 237/12.3 B; 123/543; 165/41
[58] Field of Search ............... 237/12.3 B, 12.3 A, 237/12.3 C, 12.3 R; 123/545, 546, 549, 552, 553, 525, 557, 543; 165/41

[56] References Cited

U.S. PATENT DOCUMENTS 2,807,245  9/1957  Unger ................................. 123/545
3,762,385  10/1973  Hollnagel ........................... 123/545
4,404,948  9/1983  Feltrin ............................... 123/545

Primary Examiner—Henry Bennett
Attorney, Agent, or Firm—Oblon, Fisher, Spivak, McClelland & Maier

[57] ABSTRACT

A first heat exchanger for heating the wall of an engine intake passage by engine coolant is connected in series with a parallel connection of a second heat exchanger for heating the interior of a passenger compartment and a bypass conduit via a changeover valve which directs flow of coolant alternatively either through the first heat exchanger and the bypass conduit in series and not through the second heat exchanger for summer use, or through the first heat exchanger and the second heat exchanger in series and not through the bypass conduit for winter use. The bypass conduit system has a higher coolant flow resistance than the second heat exchanger, so that the amount of heating applied to the wall of the engine intake passage is automatically reduced when the heating of the passenger compartment is switched off for summer use as compared in winter use where the heating of the passenger compartment is switched on.

3 Claims, 1 Drawing Figure

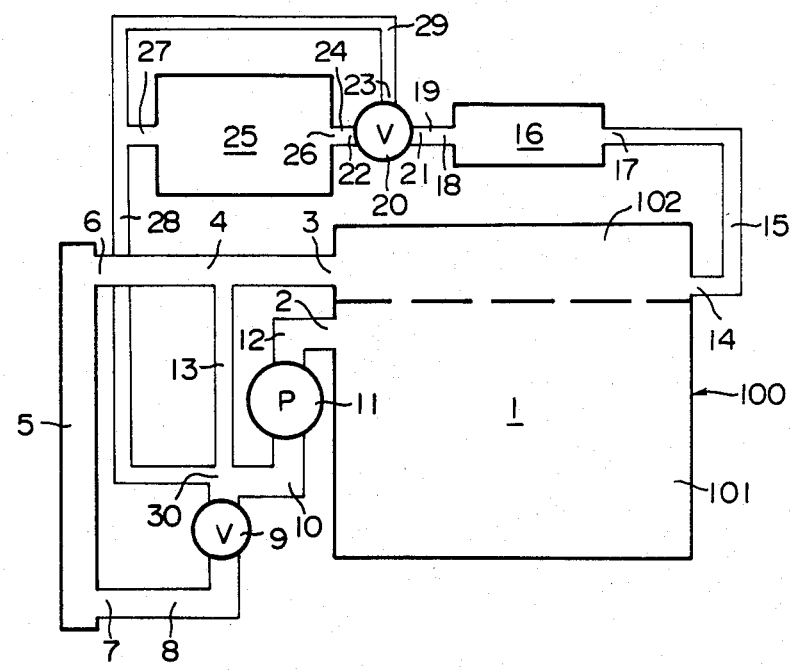

HEATER COOLANT CIRCULATION SYSTEM FOR VEHICLE PROVIDING MATCHED HEATING FOR INTAKE SYSTEM AND PASSENGER COMPARTMENT

BACKGROUND OF THE INVENTION

The present invention relates to a heater system for an automotive vehicle, and more particularly relates to a coolant circulation system for a heater of an automotive vehicle, which can provide appropriate circulation of coolant to a heater for a wall of the intake passage of the engine of the vehicle, and also to a heater for the passenger compartment of the vehicle.

In an automotive vehicle such as a passenger car the engine of which is cooled by the circulation of a coolant such as water it is known for hot coolant abstracted from the engine cooling system to be supplied to a heat exchanger for the wall of an intake passage of the engine, in order to heat up this intake passage wall so as to promote the vaporization of droplets of fuel included in the air-fuel mixture which is being sucked into the engine through said intake passage. This function is very helpful for improving the combustion of fuel in the combustion chambers of the engine, and in order to improve fuel efficiency of the engine as well as to improve the quality of the exhaust emissions thereof. This heating of the wall of the intake passage is particularly desirable during cold weather conditions such as winter conditions, in other words when the temperature of the air external to the vehicle is low and also the temperature of said wall of said intake passage when unheated may also be low, because in such cold weather conditions the problems associated with poor vaporization of the fuel are much more severe. On the other hand, in warm weather conditions such as summer conditions, this heating of the wall of the intake passage of the engine needs only to be performed to a lesser amount, because the fuel is much better vaporized in the carburetor or the like of the vehicle due to the higher temperature of the intake air, and also because the intake passage wall may be warmer in any case even when unheated. In the prior art, therefore, a system has been required to be provided for altering the amount of coolant flow to the above mentioned intake passage wall heat exchanger according to the temperature external to the vehicle, such as for example a system including a control valve for regulating the amount of coolant flow supplied to said intake passage heat exchanger. Such a system also requires a thermostatic control valve or the like for sensing the temperature of the ambient air.

Further, it is also per se well known to provide a heat exchanger for heating up the air inside the passenger compartment of the vehicle, both from the point of view of passenger comfort and also in order to provide demisting or defrosting action for a windshield of the vehicle. Again, such a passenger compartment heat exchanger is typically supplied with hot coolant abstracted from the engine cooling system. Such heating action for the air in the passenger compartment is only, typically, required by the driver of the vehicle when the external air temperature is low, i.e. during winter conditions, and is not typically required when the external air temperature is reasonably high as during summer conditions. Accordingly again a system has been required to be provided for altering the amount of coolant flow to the above mentioned passenger compartment heat exchanger according to the desire of the operator, such as for example a system including a control valve for regulating the amount of coolant flow supplied to said passenger compartment heat exchanger. Such a control valve is typically manually controlled by the driver of the vehicle.

Thus, in the prior art, in a vehicle with both these types of heat exchanger, it has been necessary to provide two separate conduit systems for leading hot coolant to these two heat exchangers, and two independent control valves therefor, as well as to provide some form of automatic control for the control valve for controlling the coolant flow to the intake passage heat exchanger; and this has entailed a necessarily complicated system, with consequent decrease in manufacturability and reliability, as well as increased cost. Further, since in the prior art the two heat exchangers have been arranged in parallel with regard to their coolant supply systems, it has been necessary for the pumping power of the coolant pump of the engine of the vehicle to be relatively high, thereby further entailing an additional cost.

SUMMARY OF THE INVENTION

Accordingly, it is the primary object of the present invention to provide a heater coolant circulation system for a vehicle, which combines advantageously the two functions described above, of supply of coolant to a heat exchanger for the wall of the intake passage of the engine, and supply of coolant to a heat exchanger for heating the air in the passenger compartment of the vehicle.

It is a further object of the present invention to provide such a heater coolant circulation system for a vehicle, which combines advantageously the control functions of controlling the supplies of coolant to these two heat exchangers.

It is a further object of the present invention to provide such a heater coolant circulation system for a vehicle, which eliminates the prior art requirement for an automatic control valve, sensitive to the temperature of the outside air, for controlling the supply of coolant to the intake passage wall heat exchanger.

According to the most general aspect of the present invention, these and other objects are accomplished by a heater coolant circulation system for a vehicle comprising a passenger compartment and an engine which has an intake passage with a wall and a cooling system through which coolant is circulated, comprising: (a) a first heat exchanger system for exchanging heat between coolant flowing therethrough and said wall of said intake passage; (b) a second heat exchanger system having a coolant flow resistance for exchanging heat between coolant flowing therethrough and the interior of said passenger compartment; (c) a bypass conduit system having a coolant flow resistance which is larger than that of said second heat exchanger system; and (d) a changeover system which provides selectively either a first connection in which said first heat exchanger system and said second heat exchanger system are connected in series between a point in said cooling system of said engine at which relatively hot coolant is available at relatively high pressure and another point in said cooling system of said engine at which the coolant is at relatively low pressure without including said bypass conduit, or a second connection in which said first heat exchanger system and said bypass conduit system are connected in series between a point in said cooling system of said engine at which relatively hot coolant is available at relatively high pressure and another point in said cooling system of said engine at which the coolant is at relatively low pressure, without including said second heat exchanger system.

According to such a heater coolant circulation system, when said changeover system is changed over to provide said first connection in cold weather conditions such as winter conditions, relatively hot coolant taken out from a point in the cooling system of the engine is conducted through said first heat exchanger system for heating the wall of the intake passage of the engine and said second heat exchanger system for heating the passenger compartment in series, at a first proper flow rate, so as to provide a first desirably designed heating effect to the wall of the intake passage of the engine which is suitable for cold weather operation of the engine and also a second desirably designed heating effect to the passenger compartment, according to a proper design of said first and second heat exchanger systems with regard to the amount of their heat exchanging surfaces and the amount of their coolant flow resistances, whereas, when said changeover system is changed over to provide said second connection in warm weather conditions such as summer conditions, relatively hot coolant taken out from a point in the cooling system of the engine is conducted through said first heat exchanger system for heating the wall of the intake passage of the engine and said bypass conduit system in series, at a second proper flow rate, so as to provide a second desirably designed heating effect to the wall of the intake passage of the engine which is suitable for warm weather operation of the engine, while generating of course no heating effect to the passenger compartment, according to a proper design of said first heat exchanger system and said bypass conduit system with regard to the amount of the heat exchanging surface of said first heat exchanger system and the amount of coolant flow resistances of both said first heat exchanger system and said bypass conduit system, or, in other words, according to a proper design with regard to the balance between the amount of coolant flow resistance of said second heat exchanger system and that of said bypass conduit system. Therefore, if the design of the heat exchanging surfaces of said first and second heat exchanger systems and the design of the coolant flow resistances of said first and second heat exchanger systems and said bypass conduit system are properly adjusted under other operating conditions of the cooling system of the engine, the control required for adaptation of said first heat exchanger system for heating the wall of the intake passage of the engine according to cold or warm weather conditions is automatically simultaneously accomplished when said changeover system is operated to connect said second heat exchanger system for heating the passenger compartment to the cooling system of the engine for cold weather operation of the vehicle or to disconnect said second heat exchanger system from the cooling system of the engine for warm weather operation of the vehicle.

BRIEF DESCRIPTION OF THE DRAWING

The present invention will now be shown and described with reference to a preferred embodiment thereof, and with reference to the illustrative drawing. It should be clearly understood, however, that the description of the embodiment, and the drawing, are all of them given purely for the purposes of explanation and exemplification only, and are none of them intended to be limitative of the scope of the present invention in any way, since the scope of the present invention is to be defined solely by the legitimate and proper scope of the appended claims. In the drawing, the sole FIGURE thereof is a schematic illustration of an internal combustion engine and the cooling system therefor, showing particularly the heater coolant circulation system according to the preferred embodiment of the present invention.

DETAILED DESCRIPTION OF THE PREFERRED EMBODIMENT

Referring to the sole FIGURE, an engine, denoted by the reference numeral 100, has a coolant jacket 1, which in fact cools both the cylinder block 101 and the cylinder head 102 of the engine, although they are only schematically discriminated from one another in the drawing by a dashed line. This coolant jacket 1 receives such as cooling water through a coolant inlet aperture 2 located in the block portion of the coolant jacket 1, and outputs coolant through a coolant outlet aperture 3 which is located in the head portion of the coolant jacket 1. The coolant outlet aperture 3 is connected, via an outlet conduit 4, to a coolant inlet 6 at the upper portion of a radiator 5, and a coolant outlet 7 at the lower portion of the radiator 5 is connected, via a first return conduit portion 8, a control valve 9, a second return conduit portion 10, a coolant pump 11, and a third return conduit portion 12, to the inlet aperture 2 of the coolant jacket 1. A relatively small bypass conduit 13 is provided between the outlet conduit 4 and the portion of the second return conduit portion 10 proximate to the outlet of the control valve 9, thus bypassing the radiator 5 and the control valve 9. This main coolant circulation system between the coolant jacket 1 and the radiator 5 operates under the control of the control valve 9 in the following per se well known fashion for cooling the internal combustion engine, by the pumping action of the coolant pump 11: the control valve 9 is temperature sensitive, responding to the temperature of the coolant passing out of the bypass conduit 13, and is closed if this temperature is less than a certain predetermined value, while on the other hand being opened if this temperature is greater than said certain predetermined value.

Now the construction for providing heating for the wall of the intake passage of the internal combustion engine, and also for providing heating for the interior of the passenger compartment of the automobile incorporating said engine, will be explained. The coolant jacket also has a coolant outlet for providing heating, designated by the reference numeral 14, and this heating outlet 14 is connected, via a first conduit portion 15, to the inlet aperture 17 of a heat exchanger 16 for heating the wall of the intake passage of the internal combustion engine. The outlet 18 of this intake passage heat exchanger 16 is connected, via a second conduit portion 19, to a first port 21 of a two way control valve 20. This control valve 20 has two other ports 22 and 23. The port 22 is connected, via a third conduit portion 24, to the inlet aperture 26 of a heat exchanger 25 for heating the passenger compartment of a vehicle incorporating the shown internal combustion engine, and the outlet 27 of this passenger compartment heat exchanger 25 is connected, via a fifth conduit portion 28, to the junction point 30 between the aforesaid bypass conduit 13 and the second return conduit portion 10. On the other hand, the other port 23 of the control valve 20 is directly connected, via a heater bypass conduit 29, to the fifth conduit portion 28, thus bypassing the passenger compartment heat exchanger 25. This bypass conduit 29 is relatively narrow and has a higher flow resistance than the coolant flow system including the third conduit portion 24 and the passenger compartment heat exchanger 25.

In the shown preferred embodiment of the heater coolant circulation system according to the present invention, the function of the control valve 20 is as follows: when a control, not shown, relating to the operation of the passenger compartment heating system of the automobile is set to an "ON" position, then the port 21 of the valve 20 is communicated to its port 22, while its port 23 is not communicated to any other port. On the other hand, when the aforesaid heating system control is set to an "OFF" position, then the port 21 of the valve 20 is communicated to its port 23, while its port 22 is not communicated to any other port.

The shown coolant circulation system functions as follows, with regard to the function of the heat exchangers. As the coolant pump 11 is operated to drive the coolant around the cooling system therefor including the radiator 5 (or, in the cold case, only the bypass conduit 13) as already explained, as a matter of course it generates a pressure gradient between the interior of the coolant jacket 1 and its upstream side. Now, this pressure gradient drives a certain amount of coolant out through the outlet 14 and via the conduit portion 15 through the intake passage heat exchanger 16 and via the conduit portion 19 into the port 21 of the valve 20.

In the summer or when the ambient air temperature is relatively high, no heating will be required by the operator of the vehicle for the passenger compartment thereof, and therefore the heater control will be set to its "OFF" position, so that the port 21 of the valve 20 is communicated only to its port 23, and this coolant flow will pass down through the heater bypass conduit 29 and through the conduit portion 28 to reenter the main coolant circulation path at the junction point 30 upstream of the intake of the coolant pump 11. This flow will therefore not pass through the passenger compartment heat exchanger 25, which accordingly does not heat the passenger compartment of the vehicle, and will further have a relatively small flow volume, due to the relative narrowness and high flow resistance of the bypass conduit 29. Accordingly, a relatively small amount of heating effect will be provided for heating the wall of the intake passage of the internal combustion engine by the intake heat exchanger 16, as appropriate for such relatively warm weather summer conditions; the diameter and the length of the bypass conduit 29 are set so as to provide just the right amount of such summer intake passage heating effect.

On the other hand, in the winter or when the ambient air temperature is relatively low, a certain heating effect will be required by the operator of the vehicle for the passenger compartment thereof, and therefore the heater control will be set to its "ON" position, so that the port 21 of the valve 20 is communicated only to its port 22, so that the coolant flow through the intake passage heat exchanger 16 will now pass via the conduit portion 24 through the passenger compartment heat exchanger 25 and then through the conduit portion 28 to again reenter the main coolant circulation path upstream of the intake of the coolant pump 11. This flow will therefore now also pass through the passenger compartment heat exchanger 25, which accordingly will heat the passenger compartment of the vehicle, and will further have a relatively large flow volume, due to the relative low flow resistance of the passenger compartment heat exchanger 25. Accordingly, a relatively high amount of heating effect will now be provided for heating the wall of the intake passage of the internal combustion engine by the intake heat exchanger 16, as appropriate for such relatively cold weather winter conditions; the flow resistances of the passenger compartment heat exchanger 25 and the relevant conduit portions (such as the conduits 15 and 28, which may be the limiting factors in this winter case) are set so as to provide the right amount of such winter intake passage heating effect, which typically is required to be quite high.

Thus, according to the shown heater coolant circulation system according to the preferred embodiment of the present invention, the functions of supply of coolant to the two heat exchangers, and also the functions of controlling the amount of coolant, are advantageously combined, being performed by just this one control valve. In this system, there is no requirement for any automatic control valve, sensitive to the temperature of the outside air, for controlling the amount of coolant to the intake passage wall heat exchanger 16, as was the case in the prior art. This system automatically varies the amount of coolant to the intake passage wall heat exchanger according to whether the temperature of the ambient air is so cold as to require the heating of the passenger compartment or it is so warm as not to require the heating of the passenger compartment. As it will be appreciated from the structure of the system shown in the FIGURE, the construction of this system is very simple because it has only the one control valve 20, which may be a manually operated control valve, and accordingly this construction is reliable, easy to assemble, and cheap to manufacture.

Although the present invention has been shown and described with reference to a preferred embodiment thereof, and in terms of the illustrative drawing, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawing, but solely by the scope of the appended claims, which follow.

What is claimed is:

1. A heater coolant circulation system for a vehicle comprising a passenger compartment and an engine which has a combustion air intake passage with a wall and a cooling system through which coolant is circulated, comprising:

a first heat exchanger system for exchanging heat between coolant flowing therethrough and said wall of said intake passage;

a second heat exchanger system having a coolant flow resistance for exchanging heat between coolant flowing therethrough and the interior of said passenger compartment;

a bypass conduit system having a coolant flow resistance which is larger than that of said second heat exchanger system; and a changeover system which provides selectively either a first connection in which said first heat exchanger system and said second heat exchanger system are connected in series between a point in said cooling system of said engine at which relatively hot coolant is available at relatively high pressure and another point in said cooling system of said engine at which the coolant is at relatively low pressure without including said bypass conduit, or a second connection in which said first heat exchanger system and said bypass conduit system are connected in series between a point in said cooling system of said engine at which relatively hot coolant is available at relatively high pressure and another point in said cooling system of said engine at which the coolant is at relatively low pressure, without including said second heat exchanger system.

2. A heater coolant circulation system according to claim 1, wherein said changeover system comprises a valve which changes over coolant flow between said passenger compartment heat exchanger system and said bypass conduit system.

3. A heater coolant circulation system according to claim 1, wherein said control system comprises a valve which switches over coolant flow exiting from said first intake passage heat exchanger system to enter either said bypass conduit system or said passenger compartment heat exchanger system, said valve being positioned at the downstream side of said first heat exhanger system and at the upstream side of said second heat exchanger system and said bypass conduit system as viewed according to the flow direction of said coolant.

* * * * *